United States Patent [19]

Nagata

[11] Patent Number: 4,770,319

[45] Date of Patent: Sep. 13, 1988

[54] COAGULATING BOX FOR USE IN MAKING BEAN CURD

[75] Inventor: Zenji Nagata, Yamatotakada, Japan

[73] Assignee: Sanyo Shokuhin Kabushiki Kaisha, Nara, Japan

[21] Appl. No.: 32,587

[22] Filed: Apr. 1, 1987

[30] Foreign Application Priority Data

Jul. 8, 1986 [JP] Japan .......................... 61-104629[U]

[51] Int. Cl.$^4$ ............................................. B41B 11/60
[52] U.S. Cl. .................................... 220/324; 426/389; 426/515; 249/167; 249/169
[58] Field of Search ................ 220/324, 292; 426/112, 426/115, 130, 389, 512, 515; 249/167, 168, 169

[56] References Cited

U.S. PATENT DOCUMENTS

| | | | | |
|---|---|---|---|---|
| 701,198 | 5/1902 | Grant | ..................................... | 249/169 |
| 2,324,636 | 7/1943 | Miollis | ................................... | 426/512 |
| 3,348,802 | 10/1967 | Corbett | ................................ | 249/167 |
| 3,997,055 | 12/1976 | Box | ........................................ | 206/427 |
| 4,113,225 | 9/1978 | Corse | ................................... | 249/169 |

Primary Examiner—Stephen Marcus
Assistant Examiner—Nova Stucker
Attorney, Agent, or Firm—Wenderoth, Lind & Ponack

[57] ABSTRACT

A coagulating box for use in making bean curd. This coagulating box is open at its top side and is openable at one of its shorter sides. The openable side comprises a detachable side plate whose height is slightly above the level of soybean milk to be put in a coagulating box at a time and a reinforcing plate. The detachable side plate can be detached or fixed by unlatching or latching. After soybean milk coagulates and a block of coagulated bean curd is cut into pieces of bean curd, the detachable side plate is detached and the coagulating box is put in a water tank and is placed on a conveyor to transfer cut pieces of bean curd in the box onto a conveyor by pulling the box up diagonally.

5 Claims, 1 Drawing Sheet

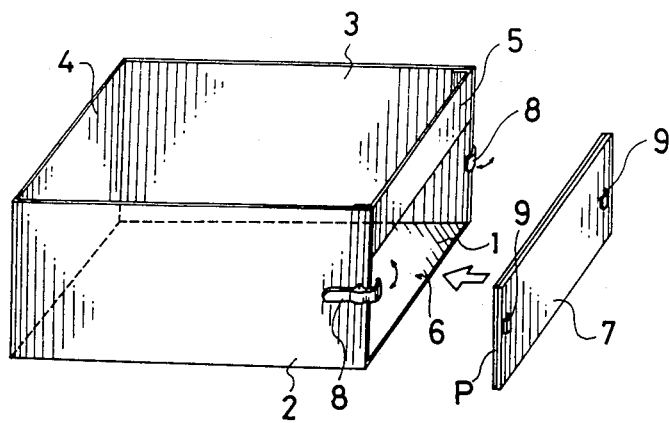
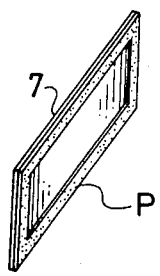
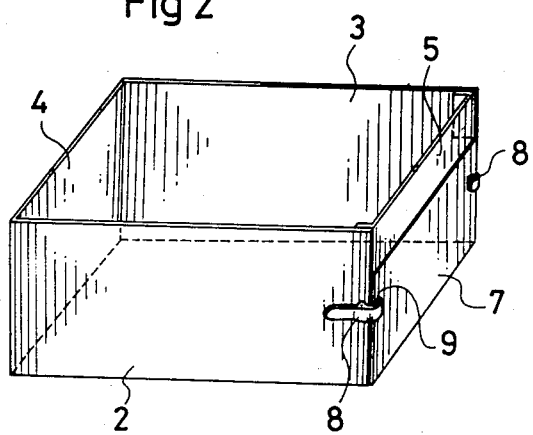
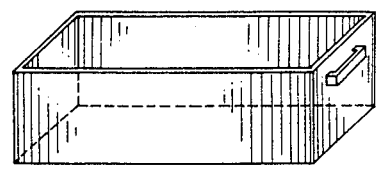
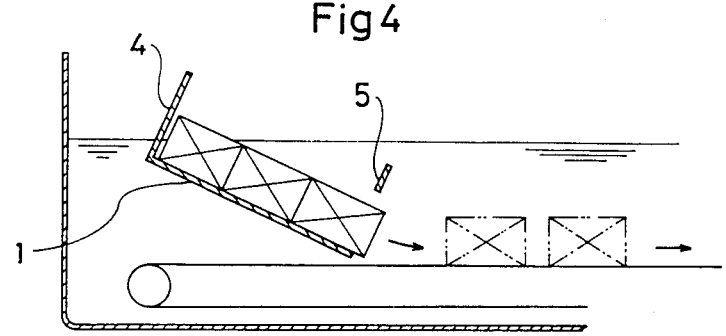

COAGULATING BOX FOR USE IN MAKING BEAN CURD

BACKGROUND OF THE INVENTION

1. Field of the invention:

This invention relates to a coagulating box for use in makiing bean curd.

2. Prior art:

In general, a coagulating box for use in making bean curd is a box made of metal designated by the Food Sanitation Act, for example, a stainless steel box, with a top side opened. In making bean curd, initially soybean milk and a coagulating agent in a specified ratio to each other are put in a coagulating box and mixed to form a mixture. This mixture is left in the box for a specified time at a specified temperature until the soybean milk is coagulated by the action of the coagulating agent. A block of bean curd thus coagulated in the box is cut into many pieces of regular size. The box is put in a water tank and is overturned to release cut pieces of bean curd from the box into the water.

In supplying cut pieces of bean curd to a packing machine, it is required to manually take them out one by one from the water tank and put them on a conveyor. Therefore, water in the tank must be warm water of a comparatively low temperature or water in which hands can be put. Various germs can easily be mixed with the tank water and it is difficult to keep such tank or water in a germ-free condition. Moreover, it is difficult to effect automation of the step of putting cut pieces of bean curd on a conveyor.

The present invention has for its object to make it possible to automate cutting, arranging on a conveyor and taking out of bean curd by using a coagulating box having a side plate which is openable.

SUMMARY OF THE INVENTION

The present invention provides a coagulating box for use in making bean curd. This coagulating box comprises two opposed longer sides, a bottom side, and two opposed shorter sides, one of the shorter sides being partly openable. The shorter side which is partly openable comprises a side plate which is detachable and a hook is provided at opposite edges thereof to engage respective opposed edges provided at an edge of the openable shorter side. Under this arrangement, cut pieces of bean curd in the coagulating box can be taken out of the box, free from breakage, easily and automatically.

BRIEF DESCRIPTION OF THE DRAWINGS

The nature and advantage of the present invention will be made more clear from the following description made with reference to the accompanying drawings, in which:

FIG. 1 shows a perspective view of a coagulating box, with a shorter side plate thereof detached, to be used in making bean curd according to the present invention;

FIG. 2 shows a perspective view of the coagulating box when it is used;

FIG. 3 shows an inner surface of a detachable side plate;

FIG. 4 is a cross sectional view of the state in which cut pieces of bean curd in the coagulating box are put on a conveyor; and FIG. 5 is a sketch of a conventional coagulating box.

DETAILED DESCRIPTION OF THE INVENTION

The present invention is described below on the basis of an embodiment shown in the drawings.

FIG. 1 shows a perspective view of a coagulating box according to the present invention, with means comprising a detachable side plate which is removed for taking out bean curd. FIG. 2 shows a coagulating box according to the present invention, with its detachable side plate in a plate for coagulating soybean milk.

The capacity of a coagulating box, namely, length, width and height of the box are determined according to the quantity of soybean milk to be put in the box each time. The box should be made of a material designated by the Food Sanitation Act, for example, stainless steel plates.

In the drawing, numeral 1 designates a rectangular bottom plate of the required size. Side plates 2, 3 are provided oppositely and integrally with the longer opposed edges of the bottom plate by deposition welding, or, a U-shaped plate can be formed into such shape by bending it. Numeral 4 designates a shorter side plate which is made integral with the bottom plate 1 and the side plates 2, 3 by deposition welding or by other means. Thus, an open coagulating box with a top side and one open lateral side thereof is formed. Numeral 5 is a reinforcing plate fixed between the side plates 2, 3. An opening 6 is provided between the reinforcing plate 5 and the bottom plate 1. This opening 6 has a height which is slightly above the level of soybean milk to be put in the coagulating box each time. Provided at the opening 6 is a detachable side plate 7 which, together with the reinforcing plate 5, occupies the same area as the opposing side plate 4. Packing P is provided completely around the periphery of the inner surface of the side plate 7 at the positions where the side plate 7 makes contact with the end faces of the side plates 2, 3 and the bottom plate 1 so as to ensure watertightness when the side plate 7 is applied to the opening 6. The packing P may be of any suitable material which may be of a plate type, tape type or the like. Hooks 9 extend outwardly from opposed lateral edges of the side plate 7 and latches 8, 8 of a swingable lever type are provided at outer edges of the side plates 2, 3. The side plate 7 is fixed firmly and in a watertight manner to the side plates 2, 3 by latching the latches 8 to the hooks 9.

The hook 8 and the latch 9 can be of any type so long as firm latching of the side plate 7 is ensured.

When making bean curd by using the coagulating box of the construction stated above, a predetermined quantity of soybean milk and a coagulating agent of the quantity suitable for the quantity of soybean milk are put in the coagulating box and mixed together. With the lapse of a specified time at a specified temperature, the soybean milk coagulates by the action of the coagulating agent into a large block of bean curd. The block of bean curd is cut into pieces of regular size by a cutter which is inserted from above the box. Then, the side plate 7 is detached by unlatching and the coagulating box is put in a water tank as it is and is placed on a conveyor of an automatic packing device, with its opening inclined downwardly. By pulling the coagulating box up diagonally, cut pieces of bean curd in the box can be transferred from the box onto the conveyor easily, free from breakage of bean curd. This dispenses with taking out cut pieces of bean curd one by one from the box by hand and ensures smooth supply of cut pieces of bean curd to an automatic packing device.

What is claimed is:

1. A coagulating box for use in making bean curd comprising two spaced-apart, parallel opposite side plates, one shorter side plate, a reinforcing plate, a detachable side plate and a bottom plate, the box having a top side opening and one side surface opening between free edges of said two side plates, wherein said one side surface opening extends slightly above a level of soybean milk to be put in the coagulating box, upper parts of said two opposite side plates are connected and fixed together by said reinforcing plate so as to define said one side surface opening between said reinforcing plate and said bottom plate and to reinforce said two side plates and to keep the distance between said two side plates constant, said detachable side plate has a packing at an inner side thereof so as to seal said one side surface opening when said detachable side plate covers said one side surface opening, latches are provided at edges of said two opposite side plates and hooks are provided at opposite edges of said detachable side plate for engaging said latches.

2. A coagulating box which is open at the top thereof for use in making bean curd, comprising:

a bottom plate;

first and second side plates, each of which extends parallel to each other and upwardly from a respective one of two opposed free edges of said bottom plate, said first and second side plates being formed integrally with said bottom plate;

a third side plate extending between free edges of one end of said first and second side plates and extending upwardly from a free edge of said bottom plate which extends between said two opposed edges of said bottom plate, said third side plate being formed integrally with said bottom plate;

a reinforcing plate extending between free edges of upper portions of the other end of said first and second side plates, said reinforcing plate being spaced from said bottom plate and defining an opening therebetween and between said free edges at said other end of said first and second side plates, said opening having a height sufficient to allow removal of coagulated bean curd through said opening;

a fourth side plate removably attached to said first and second side plates for sealing said opening in a watertight manner;

latch means connected between said first and second side plates and said fourth side plate for attaching said fourth side plate to said first and second side plates; and packing means for sealing said fourth side plate to said first and second side plates and to said bottom side plate in a watertight manner.

3. The coagulating box of claim 2, wherein said latch means comprises a pair of latches, each of which is mounted on a respective one of said first and second side plates at a position adjacent said opening, said latch means further comprising a pair of hooks, each of which is mounted on an outer surface of said fourth side plate at a position whereat a respective one of said latches is engageable with a respective one of said hooks.

4. The coagulating box of claim 3, wherein said packing means comprises a packing disposed on an inner surface of said fourth side plate so as to seal said opening in a watertight manner by engaging said first and second side plates and said bottom plate.

5. The coagulating box of claim 4, wherein said packing seals all of said opening by engaging said reinforcing plate in addition to said bottom plate and said first and second side plates.

* * * * *